Feb. 24, 1959  C. W. CHESTER  2,874,994
GLARE SHIELD FOR AUTOMOBILES
Filed June 22, 1956
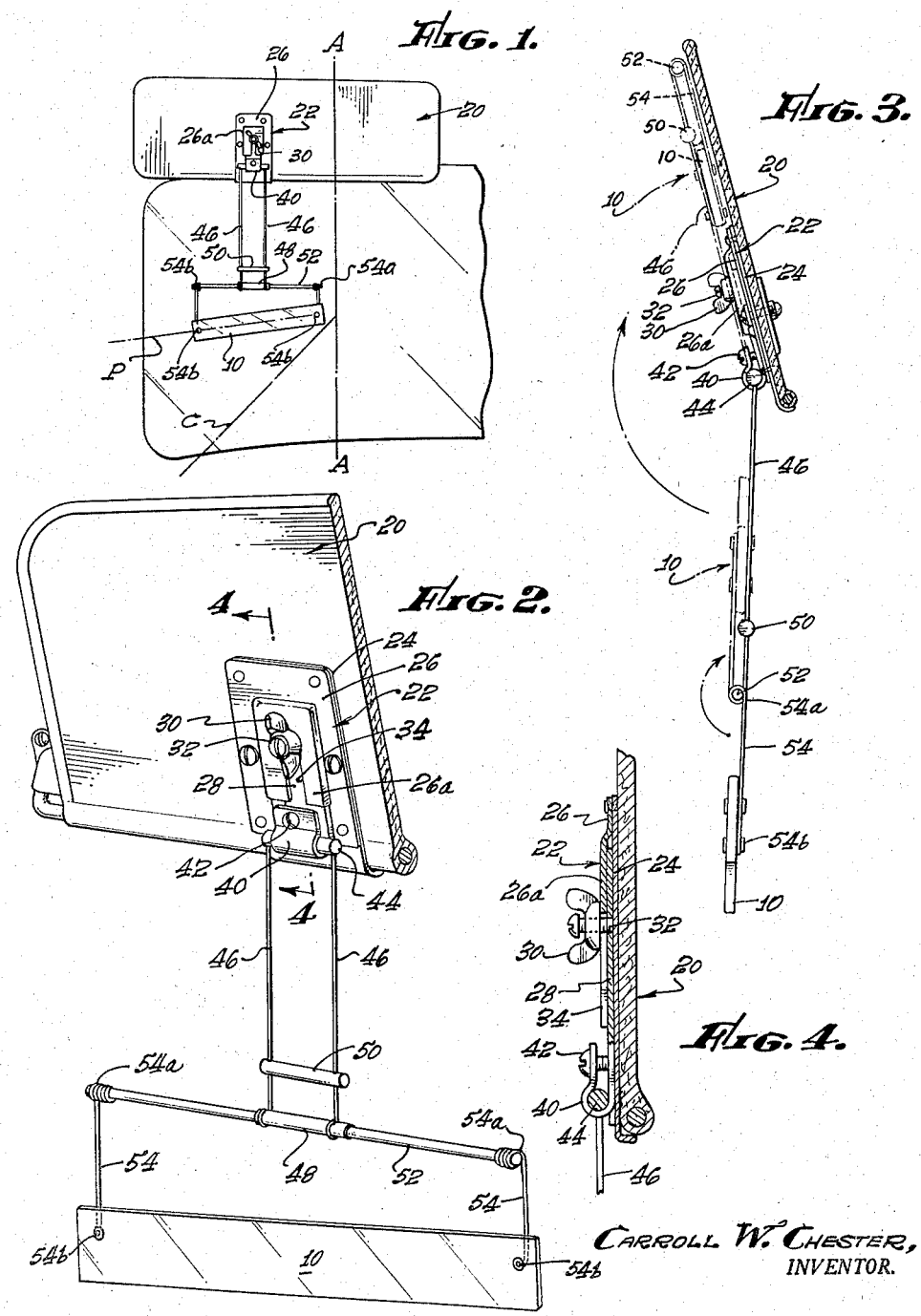
CARROLL W. CHESTER,
INVENTOR.
BY Barkalew + Lewis
ATTORNEYS.

ns
Patented Feb. 24, 1959

2,874,994
GLARE SHIELD FOR AUTOMOBILES
Carroll W. Chester, Los Angeles, Calif.
Application June 22, 1956, Serial No. 593,227
3 Claims. (Cl. 296—97)

This invention relates to improvements on the type of glare shield shown in my application for United States patent, Ser. No. 404,624, filed January 18, 1954, now Patent No. 2,757,955, issued August 7, 1956; and the objectives of the present invention include, among other things, the simplification of structure, reduction in cost of manufacture, and improvement in ease and simplicity of adjustment of shields of that type and character.

The structure shown in my said prior application provides a foldable mounting for an elongate shield element adapted to be adjustably positioned in front of an automobile driver in such position as to shield his eyes from the glare of oncoming headlights. In addition to adjustment for height, the mounting provides also for both longitudinal and angular adjustment of the shield element in a transverse plane.

I have found that a narrow, elongate shield element can be set at a fixed angle to the horizontal, without need of angular adjustment, and effectively shield the driver's eyes from oncoming lights. My present improvement involves, among other things, the provision of a mounting of extreme simplicity and low cost, providing for easy and quick longitudinal adjustment of the shield element in the lateral plane before the driver, without disturbing the predetermined angular setting.

A preferred and illustrative form of my present improved device is illustrated in the accompanying drawings, in which:

Fig. 1 is a diagrammatic view illustrating the general relation of the shield and its mounting, shown mounted preferably on the usual sun visor;

Fig. 2 is a perspective illustrating the preferred mounting;

Fig. 3 is a side elevation illustrating the embodiment of Fig. 2; and

Fig. 4 is an enlarged section on line 4—4 of Fig. 2.

The relation of the shield element 10, positioned in a transverse plane before the driver, to the apparent paths of on-coming headlights is fully discussed and explained in my said prior application and need not be repeated here. Reference may be had to that application. It suffices here to say that, with the elongate shield element 10 hung at an angle of about 5° to the horizontal, the shield when adjusted in height and lateral position to suit the driver's eye height and seat position, will shield his eyes from on-coming lights. In Fig. 1, A—A represents the plane of the driver's line of sight looking straight ahead; C represents the center line of the road; and P represents the average apparent path of approaching headlights.

The shield mounting may be mounted on the upper part of the windshield framing, but, as shown here, is preferably mounted on the standard sun visor 20. A mounting member 22 is secured, as by riveting, or by screws, to the lower part of that face of 20 which is rearward when 20 is thrown up to its non-use position, as shown. Mounting member 22 may be composed of two pieces of stamped sheet metal 24 and 26 secured together, as by riveting. Sheet metal member 26 has a forwardly recessed part 26a under which the tongue 28 of a mounting bracket may be slipped and secured by the thumb nut 30 on a bolt or screw 32 set in 28. The screw 32 slides up in a slot 34 as tongue 28 is inserted. The shield hanger and shield are hung from 28; and with this mounting arrangement the hanger and shield are easily detachable from the mounting. Further, as will appear, the length of tongue 28 and slot 34 provide for a certain amount of vertical adjustability for the hanger and shield to suit different eye heights.

The lower end of tongue 28 is bent to form a cylindric shaped clamp 40 and provided with a tightening screw 42. The clamp takes the trunnion 44 on a horizontal axis. Two thin hanger members, preferably in the form of stiff wires or small rods 46 are secured at their upper ends to 44 and normally depend as shown in the drawings. At their lower spaced ends, members 46 carry a horizontal tube 48, rigidly secured to 46 in any suitable manner. Tube 48, in addition to its other function explained below, acts as a spacer at the lower ends of hanger members 46. Another spacer 50 may be applied across medial portions of 46 if desired.

A horizontal shield carrier rod 52 is horizontally slidable and also rotatable in tube 48, both those relative movements being preferably free, so that the rod is freely slidable and so that shield 10, hung from rod 52, will always hang in a vertical plane. Shield element 10 is hung from rod 52 on two thin hanger wires 54, attached to 52 at their upper ends at 54a in any suitable manner and attached at their lower ends at 54b, rigidly, to element 10 in any suitable manner. The lengths of hanger wires 54, or their points of attachment to 10, are such that 10 is supported at the angle to the horizontal previously stated.

Shield element 10 can be narrower at its right hand end than at its left, the vertical variation of the apparent path of approaching lights at a distance of, say, five hundred feet, is negligible. However, it may be a simple elongate rectangle in form as shown here. I have found that shield dimensions about 1" wide and 6" or 7" long are sufficient for full eye shielding from headlights as they approach far down the road and until they are passing, or approaching the passing position on the left. The shield element is preferably composed of a thin transparent plastic colored with a transparent color to absorb a sufficient amount of light to render the approaching lights non-glaring.

In use, the height of the shield can be adjusted to varying eye-heights by the adjustment at 30 and by swinging the hanger 46, 48 forward or back about pivot trunnion 44. Lateral adjustment to suit the driver's lateral position on the seat is made with one hand simply by sliding 52 in 48 horizontally. That adjustment does not disturb the angular setting of 10 at all. And if, in making that lateral adjustment, the shield is moved out of its proper position in a vertical plane, upon release by the hand it immediately moves under gravity to that vertical position in the vertical plane which has been set by the setting of the hanger 46, 48 in the clamp 40.

When not in use, the whole hanger and shield element may be detached by loosening thumb-nut 30 and sliding member 28 out of 22. Or, element 10 may be folded up on 46 as shown in dotted lines in Fig. 3, and then 46 and the folded shield may be swung up, about pivot trunnion 44, to a position against the face of visor 20, as indicated in that figure. In this connection it will be noted that the over-all vertical dimension of the unit comprising the shield 10 and its immediate support 52, 54 is less than the vertical dimension of the support unit 44, 46, 48. Consequently the shield unit can be swung up to a position flatly against the support unit (dotted lines in Fig. 3)

and then the whole folded assembly may be swung up flatly against the visor 20 or against whatever other surface the device is mounted on. This arrangement is of particular importance where, as here, the shield is immediately supported to hang freely.

I claim:

1. A glare shield structure for protection of vehicle drivers against glare of approaching headlights, comprising in combination a narrow elongate shield piece composed of semi-transparent material, and means for supporting said shield piece on the vehicle in a transverse plane in front of the driver, said supporting means comprising a substantially rigid supporting frame including at least one relatively thin elongated rod for minimizing visual obstruction, means mounting one end of the supporting frame on a substantially horizontal axis on the vehicle for swinging adjustable movement in a vertical plane about said axis, a tubular member carried by the other end of the frame on a substantially horizontal axis, a hanger rod freely rotatable in and freely longitudinally slidable through said tubular member, and means for dependently supporting the shield piece on the hanger rod.

2. A glare shield structure for protection of vehicle drivers against glare of approaching headlights, comprising in combination a narrow elongate shield piece composed of semi-transparent material, and means for supporting said shield piece on a vehicle sun-visor in a transverse plane in front of the driver, said supporting means comprising a depending support frame including at least one relatively thin elongated rod for minimizing visual obstruction, means for pivotally mounting one end of the frame on the sun-visor to permit swinging movement in a vertical plane about a substantially horizontal axis, a tubular member carried by the other end of said frame having its axis in parallel alignment with the first mentioned horizontal axis, a freely rotatable and longitudinally slidable hanger rod extending axially through said tubular member, and means for dependently supporting said shield piece on the hanger rod with its length inclined at a fixed angle to the horizontal corresponding generally to the apparent paths of approaching headlights.

3. A glare shield structure as defined in claim 2 wherein said depending support frame is of a greater length than the over-all distance between said tubular member and the lower edge of said shield piece to allow the shield piece to be folded first against the support frame and then in turn refolded with the support frame against the sun-visor on which it is mounted.

References Cited in the file of this patent

UNITED STATES PATENTS

| | | |
|---|---|---|
| 1,808,086 | Ulp | June 2, 1931 |
| 1,922,295 | Hunter | Aug. 15, 1933 |
| 2,112,726 | Kemp et al. | Mar. 29, 1938 |
| 2,477,680 | Young | Aug. 2, 1949 |

FOREIGN PATENTS

| | | |
|---|---|---|
| 887,461 | Germany | Aug. 24, 1953 |
| 402,700 | Great Britain | Dec. 7, 1933 |